United States Patent [19]

Kumagai

[11] Patent Number: 5,220,647
[45] Date of Patent: Jun. 15, 1993

[54] IMAGE PROCESSING METHOD

[75] Inventor: Ryohei Kumagai, Tokyo, Japan

[73] Assignee: Ezel, Inc., Tokyo, Japan

[21] Appl. No.: 439,022

[22] PCT Filed: Dec. 8, 1988

[86] PCT No.: PCT/JP88/01237
§ 371 Date: Nov. 6, 1989
§ 102(e) Date: Nov. 6, 1989

[30] Foreign Application Priority Data

Jun. 1, 1987 [JP] Japan .................. 62-137940

[51] Int. Cl.$^5$ ............................................. G06F 15/32
[52] U.S. Cl. ................................. 395/132; 395/129; 382/25; 382/27
[58] Field of Search .............. 364/518, 521, 522; 340/747, 750; 382/25, 27; 395/129, 132

[56] References Cited

U.S. PATENT DOCUMENTS 4,879,665 11/1989 Akatsuka .................. 364/518
4,918,742 11/1990 Simonds .................... 382/41
4,945,496 7/1990 Kurakake et al. .......... 364/518

FOREIGN PATENT DOCUMENTS 58-45746 3/1983 Japan .
59-135579 8/1984 Japan .
60-3060 1/1985 Japan .
60160581 7/1987 Japan .

OTHER PUBLICATIONS

Rafael C. Gonzalez, Paul Wintz, DIGITAL IMAGE PROCESSING, Second Edition, Nov. 1987, pp. 392-394.

Primary Examiner—Phu K. Nguyen
Attorney, Agent, or Firm—Cushman, Darby & Cushman

[57] ABSTRACT

A method for processing images is useful for generating a chain code representation of a configuration of pixels in an image. The method stores a pixel representation in first frame memory. For each pixel, "convolution information" is stored in a second frame memory. Convolution information indicates whether neighborhood pixels are part of the configuration. In one embodiment, convolution information for an object pixel is a bit string. The location of a bit in the string corresponds to a direction of displacement from the object pixel. The value of a bit in the string indicates whether a neighborhood pixel located in the corresponding direction is part of the configuration. A first method for generating a chain code expression examines the convolution information for a bit which identifies an adjacent configuration pixel. Examination begins from a bit location determined from a prior code in the chain. The position of the identified bit is then the next code in the chain. An alternate method uses a look-up table. The address of the look-up tab is the convolution information expression, and the content of the table is a chain code.

10 Claims, 4 Drawing Sheets

Notes) J modulo 7.
When K<J, J equal -7.

Notes) J modulo 7.
When K<J, J equal -7.

IMAGE PROCESSING METHOD

BACKGROUND

The present invention relates to methods for processing images and for generating chain code representations of images.

A configuration of pixels in an image may be represented as a series of vectors. Each vector represents a unit displacement in a predetermined direction and is referred to as a chain element. The series of vectors is called an "indexed sequence" or "chain code." The coordinates of each connected point are called chain coordinates.

The process of expressing an image as a series of vectors is generally called "chain coding." Chain coding is useful for representing images using a minimum amount of storage.

FIG. 1 illustrates a conventional method for generating a chain code representation of a configuration in an image. A pixel representation is scanned in a raster scan order. The first configuration pixel encountered during scanning, designated as pixel A, serves as the starting point for the chain code representation. The chain code representation will be a series of vectors tracing the boundary of the configuration in a clockwise or anti-clockwise direction. A method for tracing the boundary in an anti-clockwise direction is described as a series of steps as follows.

(a) Pixels around A are searched to locate another pixel of the configuration. Searching begins with the pixel below and to the left of pixel A and advances in an anti-clockwise direction. Since a line above A was previously scanned, no pixels of the configuration exist above A. Since a line is scanned from left to right, no pixels of the configuration exist to the left of A. In the example of FIG. 1, the pixel below and to the left of pixel A (in the direction labeled a1) is evaluated first, but is not a pixel of the configuration. Advancing in an anti-clockwise direction, the pixel below pixel A (in a direction labeled a2) is evaluated second. This second pixel is part of the configuration, and is labeled as pixel B.

(b) Pixels around B are searched to locate another pixel of the configuration. Searching begins with the pixel to the left of B when the direction from pixel A to pixel B is downward. (The upward pixel A need not be searched, and the location to the left of A was evaluated before locating A as a starting point.) Searching advances in an anti-clockwise direction. In the illustration of FIG. 1, a pixel of the configuration below and to the left of B would be found. That pixel is labeled as pixel C.

(c) After each new pixel is located, searching continues around the new pixel. When the new pixel is located in a horizontal or vertical direction from the previous pixel, searching begins from a pixel which is located two pixels around from previous pixel in the anti-clockwise direction. When the new pixel is located in a diagonal direction from the previous pixel, searching begins from a pixel which is located three pixels around from the previous pixel in the anti-clockwise direction. The chain code is completed when the process returns to pixel A.

(d) After completing a chain code representation for the configuration, the method resumes scanning the image in raster scan order beginning with pixel X (in search of a new configuration).

As can be recognized from the process described above, an image stored as raw pixel values is an inconvenient form from which to generate a chain code representation.

SUMMARY

The present invention relates to methods for generating chain code representations of configurations of pixels in an image. The boundary of a configuration can be represented as a series of chain code, each code connecting one boundary pixel to an adjacent boundary pixel. In one aspect of the invention, each boundary pixel of the configuration is given an eight bit sequence (referred to a convolution information). In a second aspect of the invention, chain codes are obtained from the eight bit sequences.

A hardware circuit generates an eight bit sequence for boundary pixels of the image. For any such pixel (referred to as an object pixel), the eight bits provide information about eight pixels adjacent to the object pixel. The value of each bit indicates whether the adjacent pixel is (or is not) part of the same configuration as the object pixel. For example, a value "1" in a bit position indicates that the pixel located in a certain direction is part of the same configuration as the object pixel.

A chain code for an object pixel is obtained based on its eight bit sequence and the prior code in the chain. The eight bit sequence is examined beginning at a selected bit position. The beginning bit position is determined from the prior code in the chain. The eight bit sequence is examined in a selected order until a bit is found which has a value indicating that a pixel located in a certain direction is part of the same configuration. The chain code for the object pixel is the bit position identified in this manner.

BRIEF DESCRIPTION OF THE DRAWINGS

FIG. 1 illustrates a portion of a configuration of pixels illustrating a method for generating chain codes.

FIG. 2 illustrates an image containing two configurations suitable for representation by chain codes.

FIG. 3 illustrates labels of pixels of FIG. 2.

FIG. 4 illustrates eight directions from an object pixel to locations of adjacent pixels and numeric identifiers for each direction.

DESCRIPTION OF THE PREFERRED EMBODIMENT

Figures 1, 2, 3, 4:
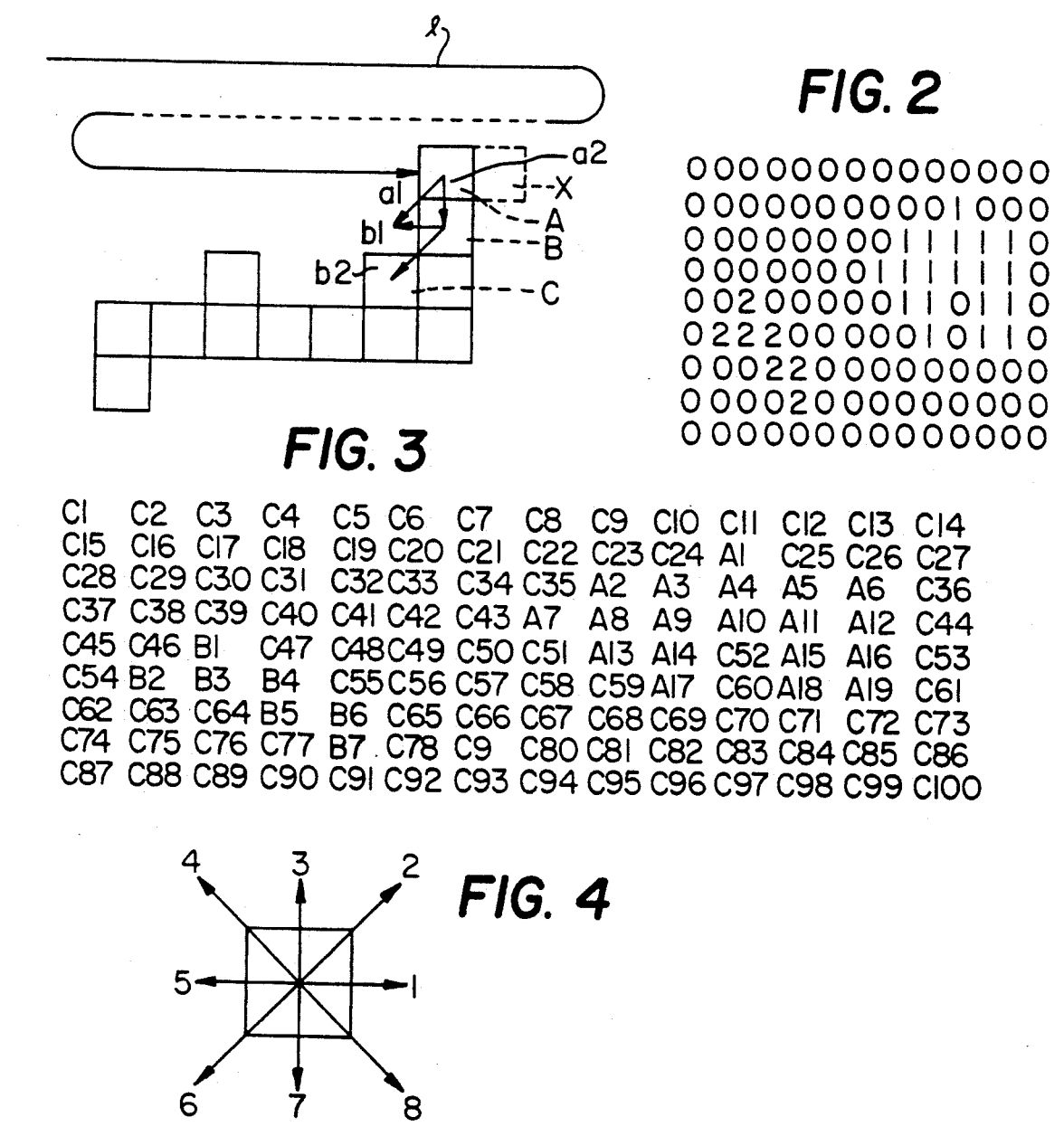
Figure 5:
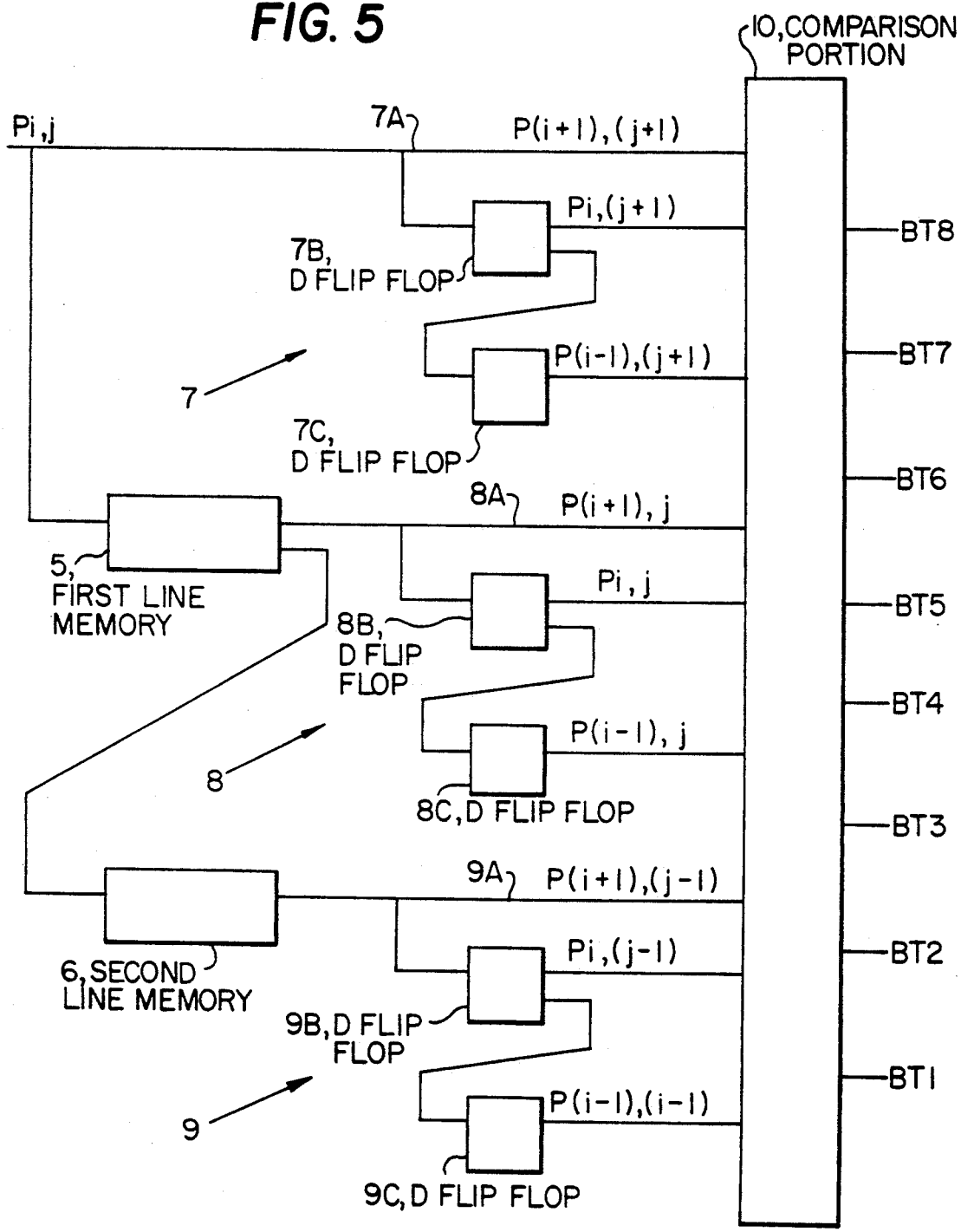
FIG. 5 illustrates a circuit for generating convolution information.

FIG. 2 illustrates pixels in an image having two configurations. Pixels of the first configuration are designated with a labeling number "1", pixels of the second configuration are designated with a labeling number "2" and pixels which are not part of either configuration are designated with a labeling number "0".

Boundary pixels define the contours of each configuration. In order to judge whether a pixel is (or is not) a boundary pixel it is necessary to compare the pixel being judged (referred to here as the object pixel) with neighboring pixels. For example, A "4-neighborhood,"

includes pixels immediately above, below, to the right and to the left of an object pixel. The object pixel is compared to neighborhood pixels to determine whether the densities of each neighborhood pixel are different from or the same as the object pixel.

When generating chain codes, it is necessary to determine connectivity of an object pixel with up to eight adjacent pixels ("8-neighborhood").

FIG. 3 illustrates a labeling arrangement for pixels in the image of FIG. 2. Each pixel is designated with a unique label. Pixels of the first configuration are designated with the letter A followed by a number. The number sequence is the order in which a raster scan would encounter the pixels Similarly, pixels of the second configuration are designated with the letter B followed by a number. Background pixels are designated by the letter C followed by a number.

FIG. 4 shows numeral designations of eight directions. For example, numeral 1 designates a direction to the right, numeral 2 designates a direction up and to the right, and numerals 3-8 designate directions advancing in an anti-clockwise rotation. It may be noted that chain codes traditionally use numerals 0 through 7 with 0 indicating a direction directly to the right, numeral 1 indicating a direction up and to the right, and numerals 2-7 advancing in an anti-clockwise rotation.

Table 1 records information about the coincidence of each pixel in the first configuration and pixels in each respective neighborhood. Columns labeled as 1 to 8 correspond to the eight directions of FIG. 4. Rows labeled as A1 to A19 corresponds to pixels in the first configuration. An entry of "1" in a row/column intersection indicates that a neighboring pixel has the same density as the object pixel. An entry of "0" indicates that a neighboring pixel has a different density. For example, Row A1 has "1" entries in columns 6, 7 and 8. These "1" entries indicate that pixels in directions 6, 7 and 8 from pixel A1 have the same density as pixel A1. An inspection of FIG. 3 verifies that pixels A3, A4 and A5 are part of the first configuration as A1 (indicating that they have the same densities).

Table 2 records information about the coincidence of pixels in the second configuration. Table 3 records information about the coincidence of pixels which are neither part of the first nor the second configurations. An entry "—" indicates that the row-pixel is on the image edge (and does not have a complete neighborhood). It is also possible to define edge pixels in other ways.

"Convolution information" refers to information which indicates the difference (or coincidence) between object pixels and pixels of their neighborhoods. Convolution information may be defined for 8-neighborhoods or 4-neighborhoods. Tables 1, 2 and 3 are examples of "convolution information" for an 8-neighborhood.

Figure 6:
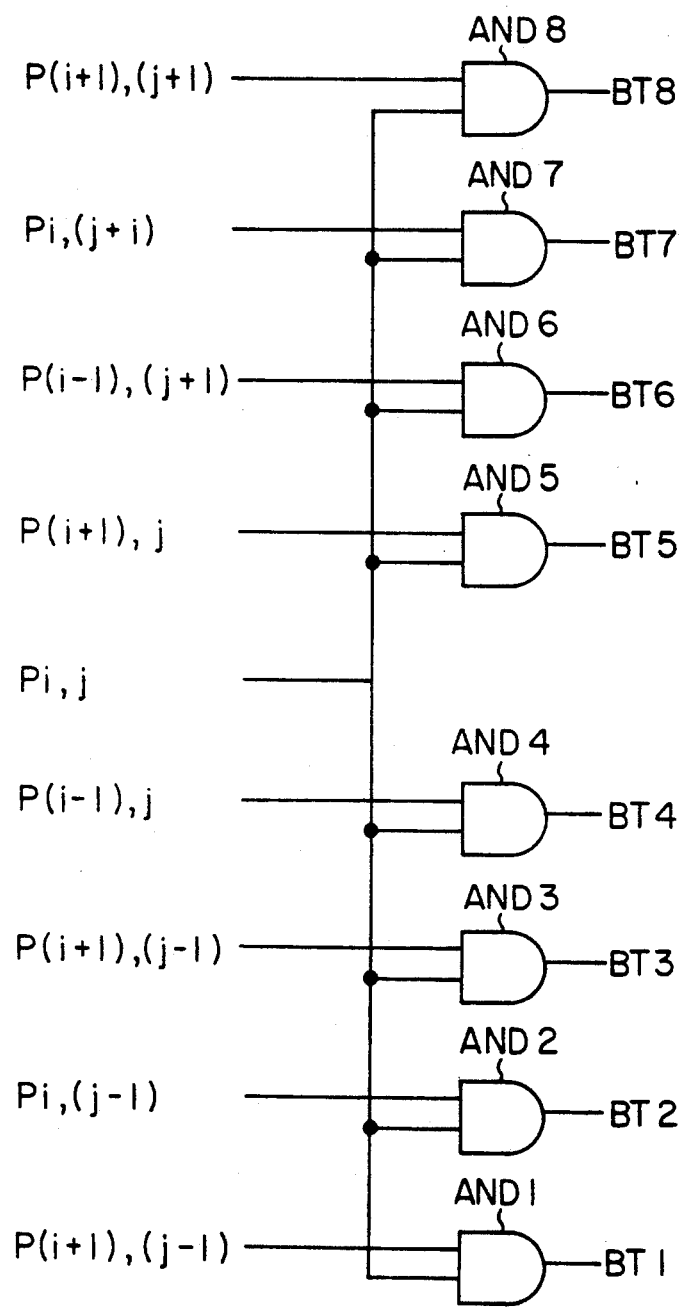
FIG. 6 illustrates a logic network from FIG. 5.

Circuits shown in FIGS. 5 and 6 rapidly generate convolution information. The circuit of FIG. 5 includes two line memories 5,6 connected in series. Each line memory has capacity for holding one scan line from an image. As an image is scanned (or as a frame memory holding a pixel representation of an image is scanned), a first scan line of pixel values is input to the first line memory 5 through a signal line 7A. As a second scan line is input to the first line memory, pixels from the first line memory 5 are input to the second line memory 6 through signal line 8A. That is to say, pixels of the of the first scan line advance to the second line memory 6. As a third scan line is input to the first line memory, pixels from the first memory advance to the second line memory, and pixels of the second line memory are output on a signal line 9A. Thus, as third line of the image is scanned, pixels from the prior two scan lines are output from the first and second line memories 5,6.

The circuit of FIG. 5 also includes three delay networks 7,8,9. Pixel values on signal lines 7A are input into delay network 7. Delay network 7 includes two D-type flip flops 7B,7C. A pixel value is input into the first flip flop 7A on a first clock cycle. As a second pixel value is input into the first flip flop 7B, the first pixel value advances into the second flip flop 7C. Similarly, pixel values output from the first line memory 5 and the second line memory 6 are input into a second delay network 8 and a third delay network 9 respectively. The second and third delay networks 8,9 include D-type flip flops 8B,8C and 9A,9B which operate in the same manner as flip flops 7B,7C of the first delay network 7.

A center pixel may be designated as $P_{i,j}$ where i and j are coordinates. The index j designates the scan line in which the pixel is located and the index i designates position along the scan line. A $3 \times 3$ convolution includes pixels to the left and right of a center pixel $P(i-1),j$, $P_{i,j}$ and $P(i+1),j$. The convolution also includes three pixels on the previous scan line $P(i-1)(j-1)$, $P_{i,}(j-1)$ and $P(i-1,j-1)$, as well as three pixels on the following scan line $P(i+1),(j+1)$, $P(i+1),j$, $P(i+1),(j+1)$.

Delay networks 7,8,9 and line memories 5,6 are clocked such that their outputs present nine pixels of a $3 \times 3$ array (convolution) of the image to a logic network 10. For example, after a first and second scan line of pixels have been input to the first line memory 5 (and the first scan line has advanced to the second line memory 6) a third scan line will be processed. As the first pixel of the third scan line is input to the first line memory 5, it is also clocked into the first flip flop 7B of the first delay network 7. At the same time, the first pixels of the first and second scan lines are clocked into the third and second delay networks 9,8 respectively. As a second pixel of the third scan line is input into the first line memory 5, it is clocked into the first flip flop 7B and the first pixel of third scan line advances from the first flip flop 7B to the second flip flop 7C. Similarly, first and second pixels of the first and second scan lines advance through their respective delay networks. As a third pixel of the third scan line is placed on signal line 7A, line memories 5,6 place the third pixels of the first and second scan lines on signal lines 8A and 8B. At this time, nine pixel values of a $3 \times 3$ convolution are presented to logic network 10 as shown in FIG. 5.

Logic network 10 performs a logical comparison of the center pixel $P_{i,j}$ with other pixels of the convolution and places convolution information for $P_{i,j}$ on signal lines BT1 – BT8. The logical formulas for each line are as follows:

$$BT1 = P_{i,j} \times P(i+1),j$$

$$BT2 = P_{i,j} \times P(i+1)(j-1)$$

$$BT3 = P_{i,j} \times P_{i,}(j-1)$$

$$BT4 = P_{i,j} \times P(i-1),(j-1)$$

$$BT5 = P_{i,j} \times P(i-1),j$$

$$BT6 = P_{i,j} \times P(i-1),(j+1)$$

$$BT7 = Pi,j \times Pi,(j+1)$$

$$BT8 = Pi,j \times P(i+1),(j+1).$$

FIG. 6 shows a logic network 10 made of AND gates which is suitable for performing logic on object pixels having a value of 1. Exclusive NOR gates can be used for comparisons which are independent of the object pixel value.

Convolution information can be stored in a frame memory. That is to say, the address of the memory corresponds to the pixel coordinates, and the address contents are the convolution information for the corresponding pixel. This organization allows immediate reading of convolution information.

In the method of the present invention, a chain code for an object pixel is determined from a prior chain code and from convolution information. Convolution information and the prior chain code are each eight bit expressions (or less). This contrasts with conventional methods which compare an eight bit object pixel value with each of up to five o six other eight bit pixel values. Thus a process using the present invention is simplified. Several processing methods are individually discussed.

Method 1

A chain code for an object pixel is determined by searching the convolution information from selected starting bit position. An eight bit expression of convolution information may be designates as Ni. The direction of the previous pixel may be designated as k (a value between 1 and 8 as shown in FIG. 4). If k is odd, Ni is examined beginning at the k+ 2nd digit N(k+2). If k is even, Ni is examined beginning at the k+ 3rd digit N(k+3). Digits are examined in increasing order until a value "1" is found. The digit so found corresponds to the chain code.

Figure 7:
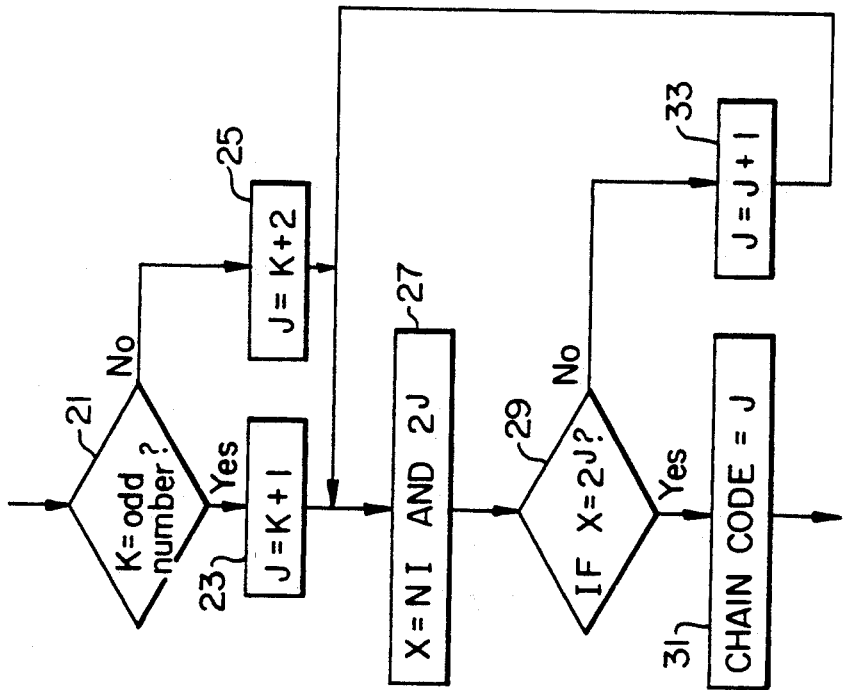
FIG. 7 is a flow diagram illustrating steps of a first method for obtaining a chain code from convolution information.

FIG. 7 is a flow chart diagraming steps of this method with BASIC expressions. In a decision step 21, k is tested to determine whether it is odd (where K is the direction code of the object pixel from the previous pixel in the chain). If so, a process step 23 sets J to K+1. If K is not odd, a process step 25 sets J to K+ 2. After setting J, a process step 27 defines X as a logical AND between Ni (all eight bits) and the value $2^J$. (The value $2^J$ has a "1" in the Jth position). A decision step 29 test the value of X. If X=1 (indicating that Ni had a "1" in the Jth position), then a process step 31 equates the chain code for the object pixel with the value J and the process is complete for that object pixel. If X is not "1", then a process step 33 increments J and examination of Ni repeats with the incremented value of J.

Method 2

Figure 8:
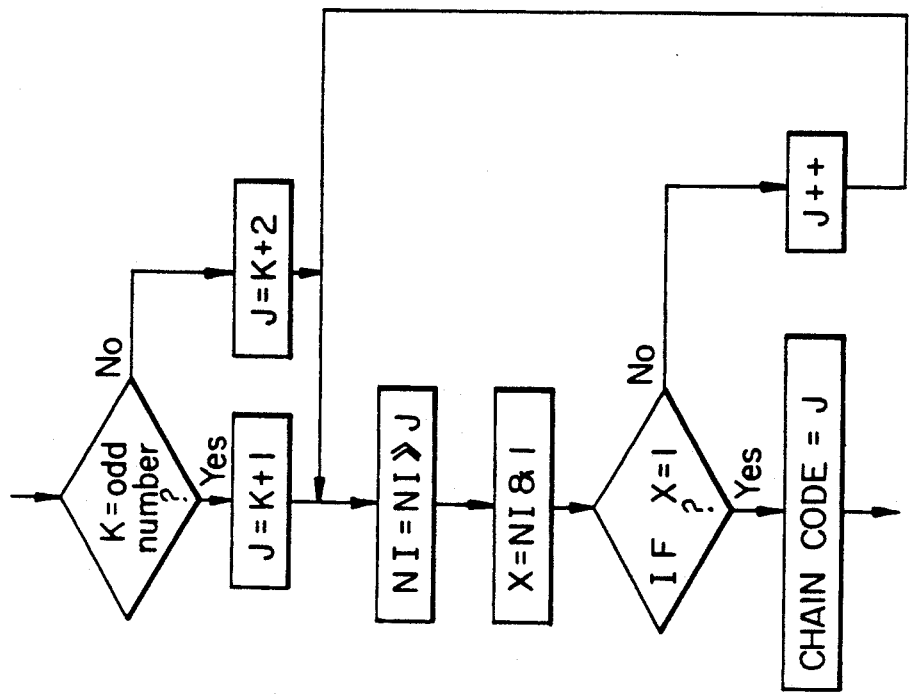
FIG. 8 is a flow diagram illustrating steps of a second method for obtaining a chain code from convolution information.

The location of a "1" digit in convolution information is determined by shifting the eight bit convolution information expression. The convolution information Ni for an object pixel is first shifted to a start position. If the direction code k from the object pixel to the previous pixel in the chain is odd, Ni is shifted K+ 1 digits to the right. If is even, Ni is shifted k+2 digits to the right. Shifting continues until a "1" is detected in the least significant bit of the shifted expression. FIG. 8 is a flow chart diagraming steps of this method with C-language expressions.

Method 3

The chain code of an object pixel can be determined from a table look-up procedure based on the convolution information and the direction code of the previous pixel in the chain.

Coding speed of methods of the present invention can be increased by limiting the methods to boundary pixels. That is to say, background pixels and pixels in the interior of a configuration need not be processed. Boundary pixels can be readily identified from the locations of "0" digits in the convolution information. The presence of a "0" in digits of the 4-neighborhood (digits 1,3,5 or 6) indicates that the object pixel is a boundary. If data is otherwise compressed, only data for boundary pixels need be extracted.

Convolution information is also useful for identifying characteristics of a chain code sequence. For example, information of the pixels in a 4-neighborhood around an object pixel gives information about whether the object pixel forms part of a vertical or horizontal line across a configuration. For example Table 4 includes rows for different convolution information expressions. The second column (headed "7 5 3 1") has "0" and "1 " entries which are possible combinations of convolution information. The first column is a decimal numeric corresponding to each convolution information expression. The third column has entries indicating whether a object pixel having the corresponding convolution information is a start point, an end point or a middle point of a horizontal segment. The fourth column has entries indicating whether a center point having the corresponding convolution information is a start point, an end point or a middle point of a vertical segment.

For example, an object pixel having convolution information "1 0 1 0" (10 decimal) has pixels directly above (direction 3) and below (direction 7). If this object pixel is part of a horizontal segment, it would be a start or end point as indicated in the third column. If this object pixel is part of a vertical segment, it would be a middle point as indicated in the fourth column.

Convolution information may be generated for sets of directions. For example, convolution information limited to directions 1, 2 and 8 can be used for chain coding a right edge.

It can be seen that convolution information in an 8-neighborhood is sufficient for generating a chain code representation.

Storing pixel density data in a first frame memory and convolution information in a second frame memory allows immediate access to both sets of information.

I claim:

1. A method for generating a chain code representation of a configuration of pixels in an image comprising steps of:

generating a pixel representation of the image;

generating first neighborhood-information expression for an object pixel of the configuration, said neighborhood-information expression representing coincidence of density between the object pixel and pixels in a neighborhood around the object pixel;

generating a neighborhood-information expression for each of a plurality of pixels of the configuration;

storing said neighborhood-information expressions in a frame memory;

obtaining a chain code representing the object pixel from the first neighborhood-information expression; and representing the configuration as a sequence of chain codes including a chain code obtained from the first neighborhood-information expression.

2. An image processing method as in claim 1 wherein said convolution-information expression comprises four bits indicating density differences between said object pixel and four adjacent pixels.

3. An image processing method as in claim 1 wherein said convolution-information expression comprises eight bits indicating density differences between said object pixel and eight adjacent pixels.

4. An image processing method as in claim 1, wherein said convolution information comprises an ordered string of convolution-information bits, said convolution-information bits indicating density differences between said object pixel and 8 adjacent pixels.

5. An image processing method as in claims 1 wherein said pixels in an image convolution information is stored in a first frame memory, and pixel values of said object pixels are stored in a second frame memory.

6. A method as in claim 1 wherein the step of generating a first convolution-information expression includes a step of generating a first ordered string of bits, a location of a bit in the ordered string corresponding to a direction in the image, a value of a bit in the string indicating that a pixel adjacent to the object pixel in the corresponding direction is part of the configuration.

7. A method as in claim 6 wherein the step of obtaining a chain code representing the object pixel from the first convolution-information expression includes a step of examining bits in the first ordered string beginning from a first position in the order, said first position determined from a chain code of a prior pixel in the configuration.

8. A method as in claim 6 wherein the step of obtaining a chain code representing the object pixel from the first convolution-information expression includes steps of:

storing the first ordered string in register;
shifting the string a plurality of times; and
testing a first bit position in the string after each shift.

9. A method as in claim 6 wherein the step of obtaining a chain code representing the object pixel from the first convolution-information expression includes steps of:

generating and storing a look-up table, said table addressed by the convolution-information expression, the contents of said look-up table comprising chain codes.

10. A method as in claim 6 wherein the step of generating a first ordered string of bits includes steps of:

storing a first line of pixels in a first line memory;
storing a second line of pixels in a second line memory;
storing a first pixel of a third line of pixels in a first storage cell and storing a second pixel of the third line of pixels in a second storage cell;
storing a first pixel of the second line of pixels in a third storage cell and storing a second pixel of the second line of pixels in a fourth storage cell;
storing a first pixel of the first line of pixels in a fifth storage cell and storing a second pixel of the first line of pixels in a sixth storage cell; and
logically combining first, second and third pixels from each of the first, second and third lines of pixels thereby generating the first ordered string of bits.

* * * * *